United States Patent [19]
Schröder et al.

[11] Patent Number: 4,858,978
[45] Date of Patent: Aug. 22, 1989

[54] COUPLING ARRANGEMENT FOR CHANGING COMPONENTS ON THE BLOCK OF A HOIST

[75] Inventors: Günter Schröder, Minden; Günther Dudek, Visselhövede, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 154,636

[22] Filed: Feb. 10, 1988

[30] Foreign Application Priority Data

Feb. 10, 1987 [DE] Fed. Rep. of Germany ....... 3703994

[51] Int. Cl.$^4$ ............................................... B66C 1/00
[52] U.S. Cl. ................................ 294/82.35; 294/86.4; 29/568
[58] Field of Search ............... 294/82.35, 82.34, 82.31, 294/82.32, 86.24, 86.26, 86.4, 906, 81.53; 414/146, 729; 29/568; 376/268, 270, 271; 901/41, 42, 50

[56] References Cited

U.S. PATENT DOCUMENTS 2,489,864  11/1949  Cravener .......................... 294/82.35
3,888,536   6/1975  Durenec ........................... 294/81.53
4,512,709   4/1985  Hennekes et al. .................... 29/568

Primary Examiner—James B. Marbert
Attorney, Agent, or Firm—Walter Ottesen

[57] ABSTRACT

The invention is directed to a coupling arrangement for changing a component on a block of a hoist which is fitted with a rotary drive. The coupling arrangement has an upper part which remains on the block and which has a latching mechanism for accommodating a lower part. Each tool or component which is to be coupled to the block has a lower part which can be coupled and latched together with the upper part so that by changing the lower part, it is possible to change the component. In order to achieve a reliable and rapid remote exchange of a component on a hoist, the upper part is configured as a hollow cylindrical part which is provided with a bottom wall. The bottom wall has a central aperture from which extend two radial slots. The hollow cylinder and the lower wall conjointly define a housing for the latching mechanisms which are disposed at about 90° in relation to corresponding ones of the radial slots. In the region of the two latching mechanisms there are respective latching channels for accommodating horizontal supporting pins of the lower part carrying the particular component. The supporting pins are passed through the radial slots and the upper part is rotated to seat the supporting pins in the latching channels.

19 Claims, 5 Drawing Sheets

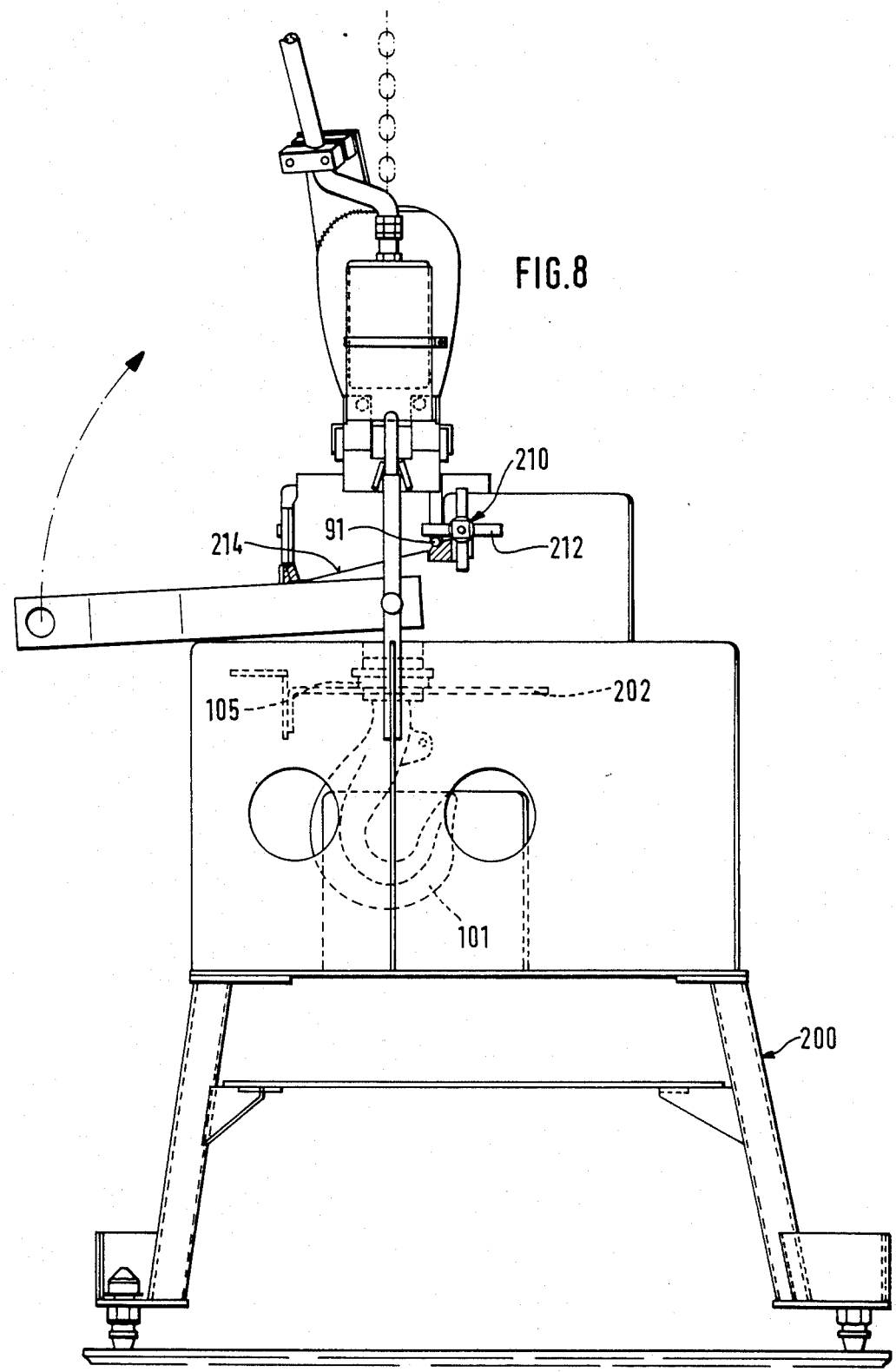

COUPLING ARRANGEMENT FOR CHANGING COMPONENTS ON THE BLOCK OF A HOIST

FIELD OF THE INVENTION

The invention relates to a coupling arrangement for changing components on a block of a hoist. The components include tools, parts and the like needed in the area wherein the hoist is utilized.

BACKGROUND OF THE INVENTION

In nuclear power installations, process components can be exchanged and repair work on such components can only be performed by remote handling because of the radioactive hazard. Such work is conducted by using television cameras and monitors together with mobile remote-handling apparatus. At the same time, also cable-operated cranes or other lifting equipment are used by which tools, working stock and exchange parts or entire process components are accurately positioned.

Lifting tackle or hoists with load-bearing hooks are used for transporting relatively large or heavy process components. On the other hand, working stock, such as impact wrenches or manipulators are moved by hoists to the appropriate working station in the shielded cell intended to hold the process components. Therefore, several hoists have to be provided for the various items or alternatively, changing the processing component or tool on a hoist has to be undertaken in a complicated process. Changing is time-consuming and difficult because it is only possible under remote-handling conditions.

Published German patent application, DE-OS No. 34 33 311 discloses a tool-changing device used in the related technical field of industrial robots and manipulators. In this field, in contrast to hoists such as a crane, other handling conditions have to be observed The known tool-changing device for industrial robots comprises an upper part which remains on the industrial robot. The associated lower part is mounted on the relevant tool When a tool has to be changed, the tool is placed in a device magazine and exchanged, together with the lower part, for a different lower part on which a different tool is mounted. A linear drive unit disposed in the upper part guides a hook-shaped structure along a slide until it engages a matching member disposed in the relevant lower part. The linear drive unit can be constructed as a compressed air cylinder, a hydraulic cylinder or an electrically operated linear drive.

Nuclear facilities such as plants for reprocessing irradiated nuclear fuels comprise what are referred to as "large-area shielded cells" in which the process components are set up on racks or frames. However, the device described above is unsuitable in such facilities since it requires a very accurate longitudinal and non-rotatable guidance of the upper part in relation to the lower part. This need for accurate guidance hampers remote-handling ability. Furthermore, in such plants, drive units which operate on compressed air or hydraulics are avoided.

SUMMARY OF THE INVENTION

It is an object of the invention to provide a coupling arrangement of the type described above wherein the various components can be quickly and safely changed on a hoist in the context of a remote-handling environment.

The coupling arrangement according to the invention is utilized for exchanging components on a block of a hoist. The coupling arrangement comprises: an upper part defining a longitudinal axis and being connected to the block so as to be rotatable about said axis; the upper part including an annular body having a base wall disposed in a plane transverse to said axis, the annular body and the base wall conjointly defining a housing; a lower part including: a head mounted on the component and defining a longitudinal axis; and two supporting pins extending from the head in a plane transverse to the longitudinal axis of the head; the base wall having slot means formed therein which is dimensioned to permit the head and the pins to pass therethrough and into the housing when the upper part is lowered over the head; and, latching means disposed in the housing at a predetermined angular spacing from the slot means for receiving and latching the supporting pins when the upper part is rotated about the longitudinal axis of the upper part after the latter has been lowered over the head.

According to another feature of the invention, the latching means can include channel means provided on the base wall for receiving the supporting pins of the lower part therein.

To receive a component attached to a lower part having the laterally extending supporting pins, the upper part of the coupling arrangement is moved together with the hoist to a position above the lower part and then lowered vertically so that the two supporting pins enter the slot means. By reason of the rotary mechanism provided on the block, the upper part is, after being further lowered, rotated through the above-mentioned predetermined angular spacing so that the supporting pins of the lower part are above the channel means. The predetermined angular spacing is preferably approximately 90°.

By raising the upper part with the crane, the supporting pins fit into the latching channels and can be secured by respective locking mechanisms Withdrawal or falling of the component out of the upper part is now no longer possible.

In order to change the component for another, the component which is coupled to the hoist is placed in a component magazine The locking mechanism is released by suitable means which can, for example, be mounted directly on the magazine. The magazine is preferably in the form of a stand mounted at a convenient location within the work area which can be a large-area shielded cell in a nuclear facility, for example. The rotary mechanism located on the block causes the upper part to be rotated back through the predetermined angular spacing so that the supporting pins of the lower part are situated above the slot means which can include radial slots. Raising of the upper part mutually separates the two parts of the coupling arrangement.

According to another feature of the invention, the latching means includes two levers corresponding to respective ones of the channels and each of the levers is pivotally mounted in the housing so as to be movable between a first position wherein the channel corresponding thereto is clear and a second position wherein the channel is blocked to hold the supporting pin therein, thereby preventing an unwanted dislodgement of the supporting pin out of said channel.

In addition, each of the levers has first and second ends and a latching bolt is mounted on the first end thereof so as to cause the same to be above the channel corresponding to the lever when the lever is in its second position. The annular body of the upper part has opening means formed therein and each of the levers is mounted in the housing so as to cause the second end thereof to extend outwardly through the opening means when the lever is in its first position thereby facilitating an actuation thereof from outside of the upper part.

The latching bolts are preferably guided horizontally and are displaceable above the supporting pins located in the latching channels. By means of the outwardly projecting second end of the lever, the latched condition can be removed by pulling back the latching bolts. The lever can be operated by manipulators present in nuclear cells or with appropriately configured release means on the magazine. Movement of the latching bolts into the latched position can also be brought about by some suitable constantly operative biasing force.

According to another feature of the invention, the latching means further includes two sets of blocks corresponding to respective ones of the supporting pins. Each one of these sets includes a first block and a second block both mounted on the base wall so as to be mutually parallel and spaced apart to define the channel for accommodating the supporting pin therein. The first block defines guide means for guiding the latching bolt into and out of its position above the channel as the lever corresponding thereto is moved into and out of its second position.

According to still another feature of the invention, each of the second blocks is configured as a circular segment defining a glide path extending downwardly from an elevation above the slot means to the channel corresponding thereto for guiding the supporting pin downwardly into its channel as the upper part is rotated through the predetermined angular spacing. This configuration facilitates the coupling process in that supporting pins which may happen to be resting on the glide paths of the second blocks slip into the latching channels when the upper part is raised.

Pursuant to a further feature of the invention, the head and the supporting pins of the lower part conjointly define a crosshead. The head is provided with annular stop means formed thereon beneath the supporting pins for contact engaging the base wall of the upper part when the latter is lowered over the crosshead. The stop means can be, for example, a collar formed on the head beneath supporting pins. The collar defines the depth to which the lower part extends into the lowered upper part. As soon as the base wall of the upper part comes to rest on the collar of the lower part, it is then assured that the supporting pins are at an elevation higher than the above-mentioned second blocks which each define one side of a latching channel.

According to another feature of the invention, each of the levers is in the form of a bell-crank lever having first and second arms. The first arm extends in a vertical direction and the outer end of the first arm is the above-mentioned first end. Articulating means articulately connect the latching bolt to the outer end of the first arm. The second arm extends horizontally and outwardly through the opening means formed in the annular body of the upper part. Pivoting of the two-armed bell-crank lever causes a horizontal displacement of the latching bolt over the latching channel corresponding thereto. The free lever arm which projects outwardly through the opening means in the annular body of the upper part can serve as an actuating member for locking or unlocking the channel and the supporting pin seated therein.

The articulating means includes bore means formed in the first arm. A lever insert is slideably mounted in the bore means and has a lower end projecting outwardly from the outer end of the first arm. The latching bolt has a slotted opening formed therein for receiving the lower end of the lever insert therein and a pin pivotally connects the lower end of the lever insert to the latching bolt within the slotted opening. In this way, the pivoting movement of the two-armed bell-crank lever is transmitted in a space-saving manner to the latching bolt.

The bell-crank lever defines a pivot axis and, according to another feature of the invention, the latching means further includes a tension spring connected at one end thereof to the second arm of the bell-crank lever at a location thereon displaced from the pivot axis. The tension spring is connected at the other end thereof to the base wall of the upper part for biasing the bell-crank lever into the second position thereof. With this biasing force applied to the bell-crank lever, the latching mechanism constantly seeks to move into the locked condition. This means that once the supporting pins have dropped into the latching channels, locking occurs automatically. Therefore, the latching mechanism only has to be actuated for the unlocking process, that is, for displacing the latching bolts out of their position above the latching channels.

According to another feature of the invention, indicating means are provided for indicating the presence of the supporting pins in the latching channels. A visual indication of the secure location of the supporting pins in the latching channels is achieved with this embodiment. In the locked condition of the coupling arrangement, a spring-loaded indicator pin must emerge outwardly from the annular body of the upper part since the supporting pin displaces the pin outwardly when seated in its latching channel.

Pursuant to another feature of the invention, a heavy metal jacket is mounted on the outer surface of the annular body. This embodiment ensures that the cable ropes or chains of the hoist are always taut.

The coupling arrangement according to the invention can also include a magazine or frame for vertically holding components which can be coupled to a remote handling apparatus such as is known from published German patent application DE-OS No. 34 21 452. The magazine accommodates components which have to be exchanged and which are provided with a lower part for coupling into the upper part. The magazine is provided with release means by which the upper part is released when lowered.

The invention provides a remotely operable coupling arrangement for changing items of working stock on hoists, such as cable operated cranes, by which the exchange process can be carried out quickly and safely. It is a substantial advantage that the operator working under remote handling conditions can easily carry out the latching and unlatching operations. The provision of the latching channels ensures a secure accommodation of the component on the upper part.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
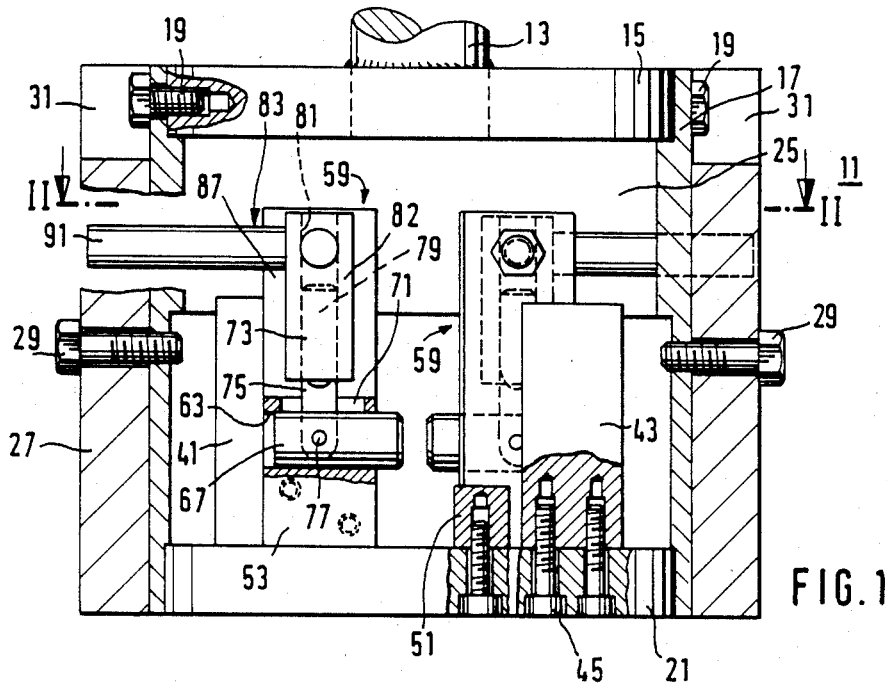
FIG. 1 is a multiple section view through an upper part of a coupling arrangement according to an embodiment of the invention which can be attached to the block of a cable-operated hoist.
Figure 2:
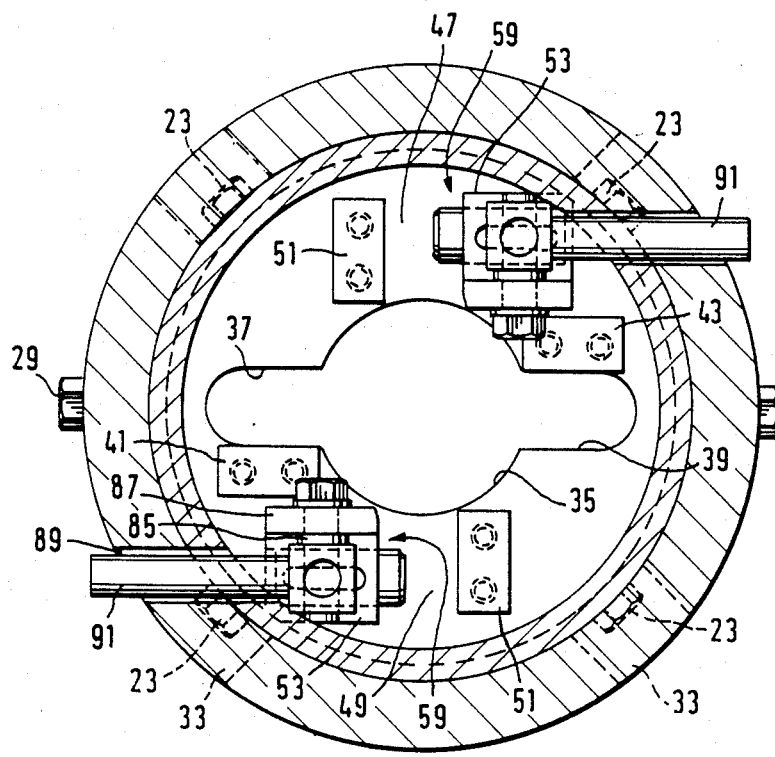
FIG. 2 is a plan view, partially in section, of the upper part taken along line II—II of FIG. 1.
Figure 3:
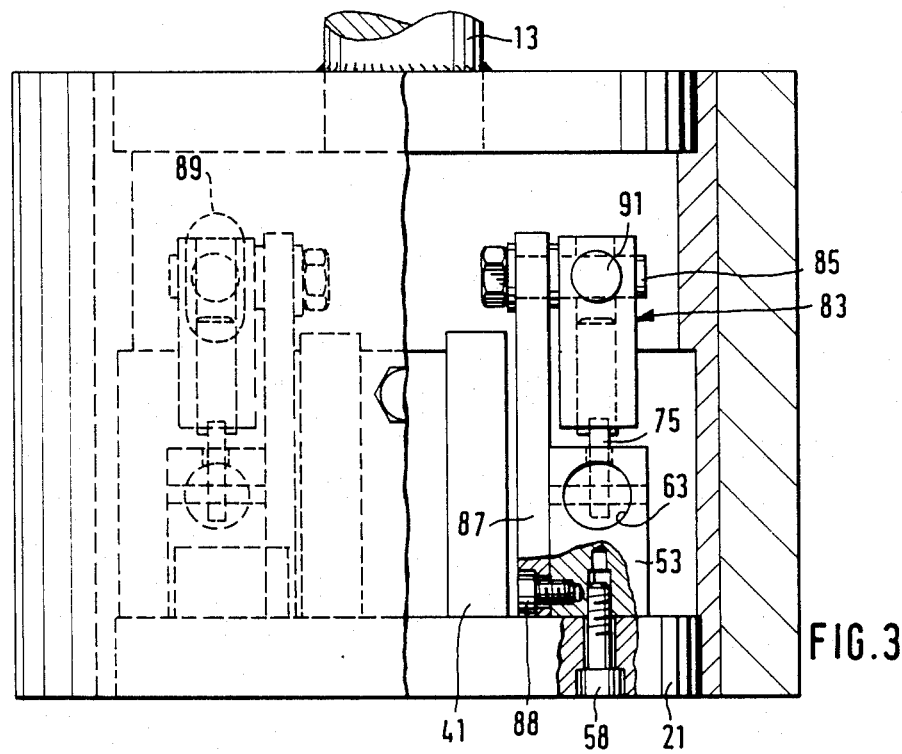
FIG. 3 is a side elevation view of the upper part of FIG. 1.

The upper part 11 of the coupling arrangement which is shown in FIGS. 1 to 3 comprises a rotation pin 13 having a thread (not shown) at its upper end adapted to threadably engage a block of a crane hoist with the block being provided with a rotary drive. The rotation pin 13 is welded into the center of an upper flange 15 which is fixed by threaded fasteners 19 in the upper opening of a vertically disposed hollow cylindrical part 17. The hollow cylindrical part 17 is closed at the other end by a base wall or flange 21 secured to the hollow cylindrical part 17 by hexagonally-headed threaded fasteners 23. The hollow cylindrical part 17 thus encloses an interior space 25 which contains the rest of the coupling assembly.

The hollow cylindrical part 17 is provided with an outer lead casing 27 fastened to the hollow cylindrical part 17 by hexagonally-headed fasteners 29. This lead casing 27 comprises cutouts 31 and 33 for the hexagonally-headed screws 19 or 23 which secure the upper flange 15 and the bottom flange 21.

The bottom flange 21 is provided with a central bore 35 from which extend two diametrically opposite radial slots 37 and 39. Each radial slot (37, 39) has adjacent one of its long sides a guide plate (41, 43) secured to the bottom flange 21 by screws 45. The guide plates (41, 43) extend upwardly over half the height of the interior 25.

The other sides of the radial slots (37, 39) are clear. Latching channels (47, 49) are offset by 90° in relation to respective ones of radial slots (37, 39). The two channels (47, 49) are each conjointly defined by respective sets of limit blocks (51, 53). The blocks (51, 53) have respectively different heights and are bolted to the bottom flange 21. Each radial slot (37, 39) is followed by the operatively associated latching channel (47, 49) in a clockwise direction as seen in FIG. 2. The two latching channels (47, 49) are of identical configuration.

Clockwise from the clear side of the radial slots (37, 39) is the comparatively lower limit block 51 over which a corresponding supporting pin 55 of a lower part 57 (FIG. 4) as yet to be described has to pass to arrive in the corresponding one of the latching channels (47, 49). The higher limiter blocks 53 are fixed by screws 58 and are disposed opposite corresponding ones of the lower limiter blocks 51 and are provided with corresponding latching mechanisms 59. The two latching mechanisms 59 are of identical configuration so that only one of them will be described.

The latching mechanism 59 includes a horizontal bore 63 formed in the higher limiter block 53 at a distance from the bottom flange 21 for slideably guiding a latching bolt 67.

An upper slot 71 in the higher limiter block 53 partly exposes the latching bolt 67 so that it can be articulately connected to a lever insert 73. This lever insert 73 has a bottom flat prismatic end 75 which fits into a slot formed in the latching bolt 67 and is articulately connected to the bolt 67 by means of a straight pin 77. The lever insert 73 extends upwardly and becomes a cylindrical portion 79 which is displaceably guided in a vertical bore 81 of a vertical lever arm 82 of a rotatably mounted two-arm lever 83.

The two-arm lever 83 is in the form of a bell-crank lever and is pivotally mounted on a vertical bearing plate 87 by means of a stepped bolt 85. The vertical bearing plate 87 is laterally bolted on the higher limiter block 53 by bolts 88. The rotatable lever 83 has a free lever arm 91 which is at right angles to lever arm 82 and which projects outwardly beyond the cross section of the upper part 11 through a slot 89 formed in the wall of the hollow cylindrical part 17 and the lead casing 27.

Figure 4:
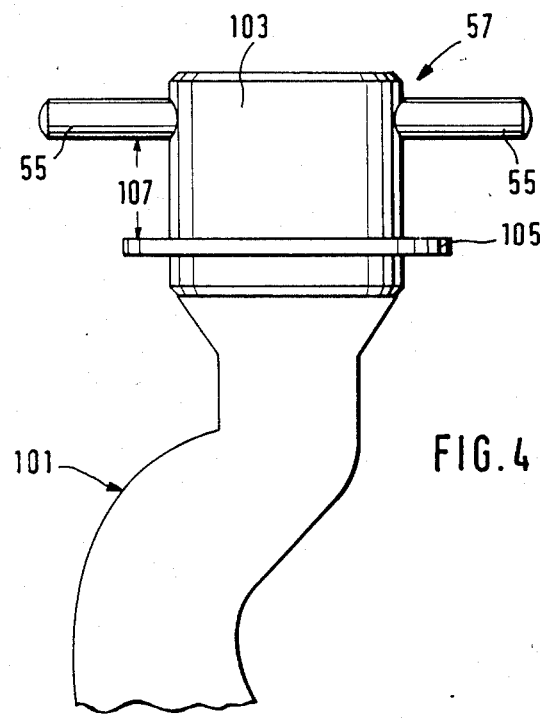
FIG. 4 shows a crane hook provided with a lower part of the coupling arrangement of the invention.

The load hook 101 shown in FIG. 4 has a rigid upper end with a latchable part 57 formed thereon and configured in the manner of a crosshead. The load hook 101 ends at the top in a cylindrical head part 103 having a diameter somewhat less than the central bore 35 in the bottom flange 21 of the upper part 11. In the upper region, the cylindrical head part 103 includes two horizontal radially outwardly projecting supporting pins 55 which are disposed diametrically opposite each other. These supporting pins 55 are dimensioned so that they pass through corresponding ones of the radial slots (37, 39) in the upper art 11.

Underneath the supporting pins 55, the cylindrical head part 103 is provided with a continuous collar 105 which is disposed beneath the supporting pins 55 by a predetermined elevation 107. The diameter of the collar 105 is greater than the diameter of the central bore 35 of the upper part 11. The clear dimension 107 between supporting pins 55 and collar 105 is chosen to be somewhat greater than the height of the lower limiter block 51 so that the supporting pins 55 can pass over the limiter blocks 51 when the upper part 11 is rotated.

The operation of the coupling arrangement according to the invention will be described below.

For taking up the load hook 101, which is normally kept upright in a magazine, the upper part 11 of the coupling arrangement is moved by a crane equipped with a cable hoist to a position above the crosshead 57 so that upon the subsequent vertical lowering of the upper part 11, the two diametrically opposed supporting pins 55 pass through the radial slots (37, 39) and into the interior 25 of the upper part 11. The upper part 11 is lowered until the bottom flange 21 rests lightly on the collar 105 of the crosshead 57 of the load hook 101. The upper part 11 is then rotated through 90° by a rotating mechanism provided on the block of the cable hoist (not shown). During this rotational movement of the upper part 11, the supporting pins 55 come with their long sides into contact engagement with the end faces of corresponding ones of the latching bolts 67 and push the latter rearwardly into the horizontal bores 63. The supporting pins 55 now are located above respective ones of the latching shafts (47, 49).

Raising of the upper part 11 by the cable hoist causes the supporting pins 55 to seat in corresponding ones of the latching channels (47, 49) so that they can be secured by the latching mechanisms 59. This can happen, for example, by manipulators acting on the lever arms 91 projecting outwardly beyond the casing 27 of the upper part 11. However, this can be made to take place automatically by suitably distributing the weight of the rotatable lever 83. Withdrawal or dropping of a component out of the upper part is now no longer possible during subsequent transport or working operations.

Figure 7:
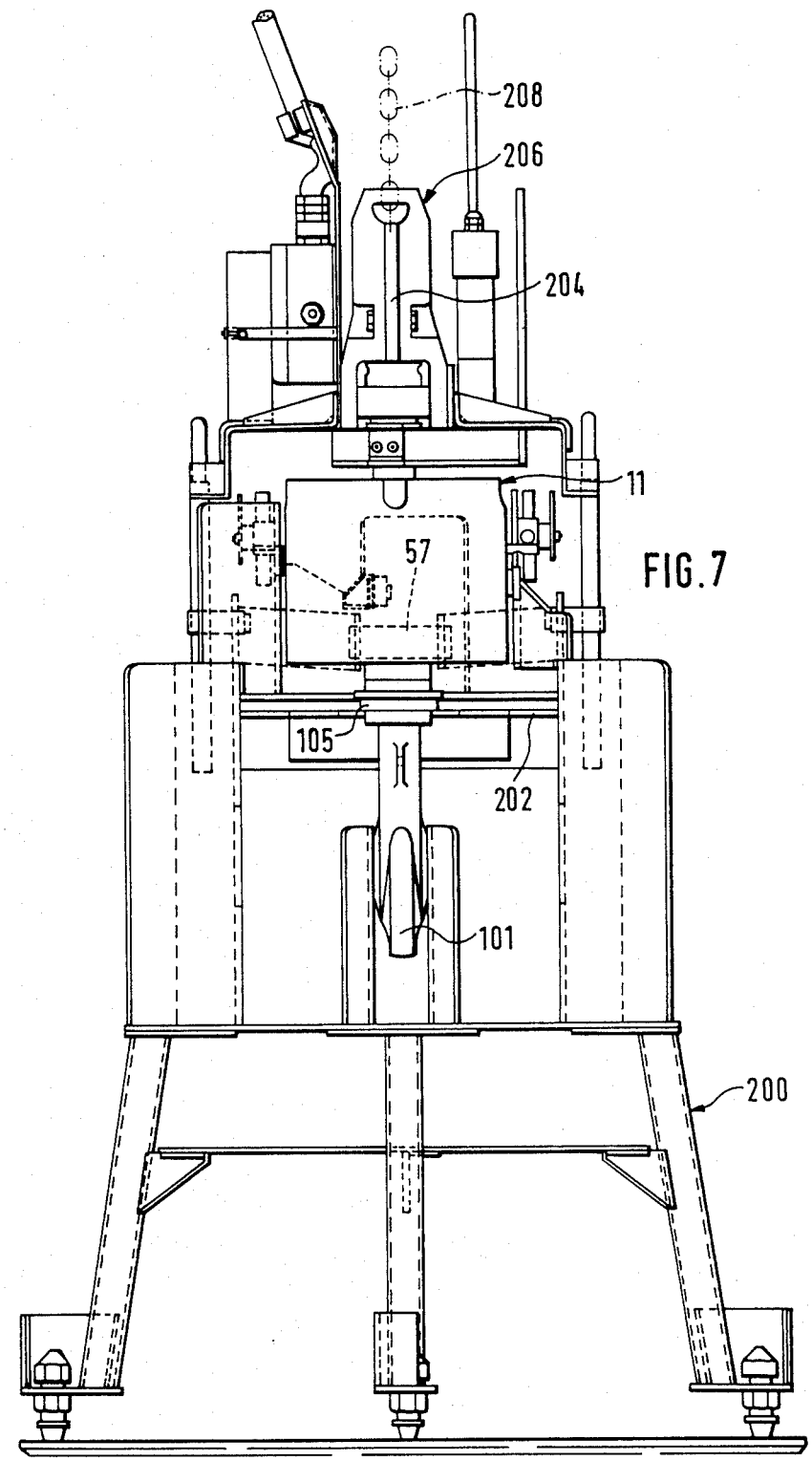
FIG. 7 is a front elevation view of a stand for accommodating a lower part and a component attached to the latter when the component is not in use; and, FIG. 8 is a side elevation view of the stand of FIG. 7.

The load hook 101 is placed in a magazine such as shown in FIGS. 7 and 8 in order to exchange the load hook 101 for some other component. The latching mechanisms 59 are released by suitable means in that the lever arms 91 of the rotatable lever 83 are moved upwardly. The upper part 11 is now lowered farther until it rests lightly on the collar 105 of the crosshead 57. The rotating mechanism provided on the block rotates the upper part back through 90° so that the supporting pins 55 of the lower part 57 are located above the radial slots (37, 39). When the upper part 11 is now raised, the upper part 11 of the coupling arrangement separates from the lower part 57 so that the upper part 11 is immediately available to receive some other component which is likewise provided with a lower part 57.

Figure 5:
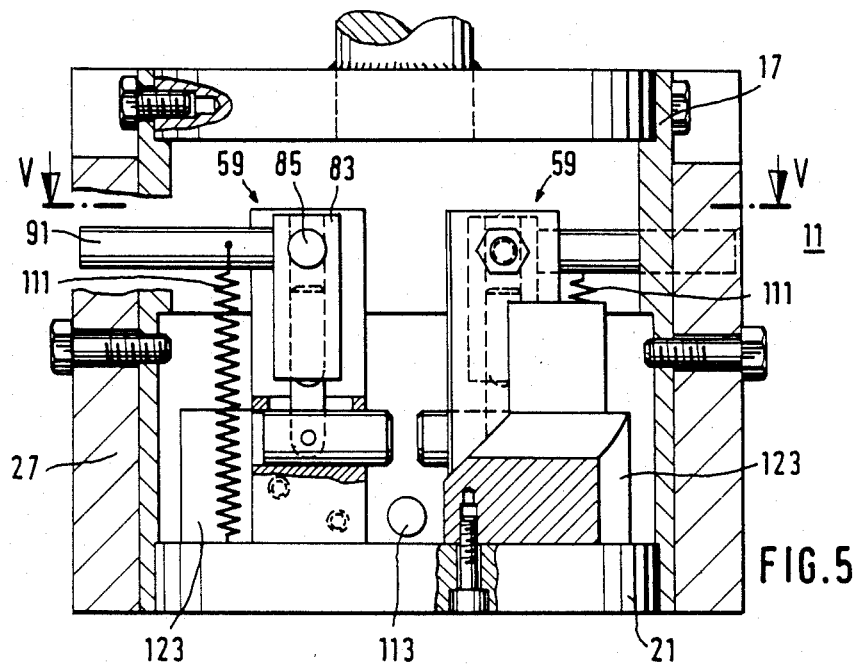
FIG. 5 shows a modified upper part of a coupling arrangement according to another embodiment of the invention.
Figure 6:
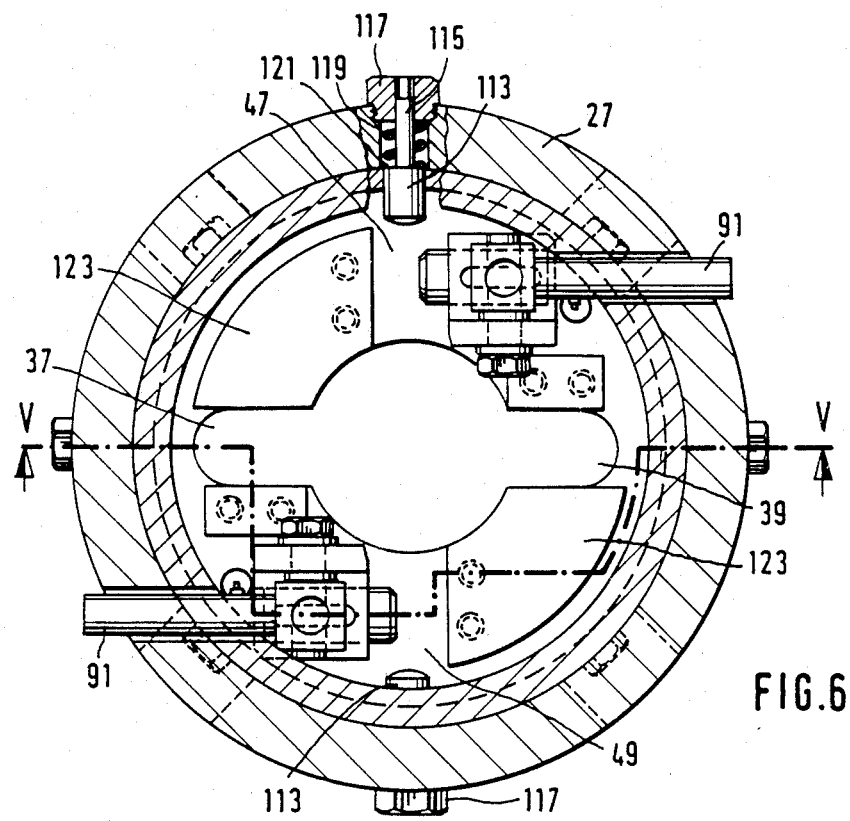
FIG. 6 is a plan view of the upper part of FIG. 5, partially in section, and taken along line V—V of FIG. 5.

The embodiment shown in FIGS. 5 and 6 of an upper part 11 which remains on the block of a cable hoist has a tension spring 111 for each latching mechanism 59. The upper end of spring 111 is fixed to the horizontal free lever arm 91 of the rotatable lever 83. The other end is secured on the bottom flange 21 of the upper part 11. These tension springs 111 are mounted offset to the axes of rotation 85 of the rotatable levers 83 and load the latching mechanisms 59 to resiliently bias them into the latching position. Once the supporting pins 55 have dropped into the latching channels (47, 49), latching occurs automatically to secure the supporting pins 55.

Two indicator pins 113 are disposed in the wall of the hollow cylindrical part 17 which have respective inner ends projecting into respective latching channels (47, 49). Each indicating pin 113 comprises a coaxial indicator extension 115 which is accommodated in a bore of a plug 117 threadably mounted in the lead casing 27. In the unloaded condition, the indicator extension is substantially flush with the outside of the plug 117. A compression spring 119 is disposed around each indicator extension 115 and is braced on the end face of the plug 117 and on an annular shoulder 121 of the displaceable indicator pin 113. In the latched condition of the coupling arrangement, the spring loaded indicator pin 113 is forced by the supporting pins 55 outwardly from the casing 27 of the coupling arrangement. Thus, a visual indication of the position of the supporting pins 55 in the latching channels (47, 49) is obtained.

One boundary of each of the latching channels (47, 49) is formed by a respective one of sliding blocks 123 configured as an arcuate segment which extends from the corresponding one of the radial slots (37, 39) to the corresponding one of the latching channels (47, 49). The sliding blocks 123 each have a downward slope extending from the corresponding one of the radial slots (37, 39) to the corresponding one of the latching channels (47, 49). While the upper part 11 is being raised and if the component together with its supporting pins 55 cannot be positioned above the latching channels (47, 49) and instead come to rest on the sliding blocks 123, then as the upper part 11 is raised, the supporting pins 55 slide on the inclined surfaces of sliding blocks 123 and move into the latching channels (47, 49).

FIG. 7 shows a magazine 200 having a seat 202 for accommodating a component in the form of a hook 101 and its lower part 57. The upper part 11 is shown in position over the lower part 57. The upper part 11 is attached to the block 204 of a cable hoist 206 which is supported by its cable 208 from an overhead crane (not shown). The block 204 contains an electric motor for rotating the upper part 11 about its longitudinal axis and relative to the lower part 57.

Referring now to FIG. 8, the magazine 200 is provided with release means in the form of a wheel 210 having four pins 212. The wheel is resiliently biased to detent in four positions separated by 90° one from the other and is shown in one of its four positions in FIG. 8.

The pins 212 engage the outer end of the lever 91 when the upper part is coupled to the lower part and is lowered into the magazine 200 and before the collar 105 contact engages the seat 202. The resilient-biasing force acting on the wheel 210 is sufficient to rotate the bell-crank lever 83 (FIG. 1) into its first position as the upper part is lowered thereby clearing the latching channels (47, 49) and unlatching the supporting pins 55. After lever 83 is in its first position, the outer end 91 now applies sufficient force to wheel 210 that the latter overcomes its detenting biasing force and rotates 90° and pin 91 is in the position shown in FIG. 8 and the collar 105 is in contact engagement with seat 202. The supporting pins 55 are clear of their respective latching channels (47, 49) and the upper part 11 is rotated through 90° by the electric motor in block 204. Thereafter the hoist can lift the upper part 11 clear of the lower part 57.

When engaging a lower part 57 seated in a magazine 200, the upper part is rotated in the reverse direction through 90° and the outer ends of levers 91 are guided on inclined surfaces 214 until they are in the position shown in FIG. 8. When the upper part 11 is pulled upwardly by the hoist 206, the pins 212 of wheel 210 apply a force to the outer ends of levers 91 thereby ensuring that the bell-crank levers are in their second position so that the supporting pins 55 are safely latched in the latching channels (47, 49).

Although the coupling arrangement is shown here with a component in the form of a hook 101, other components can be transported such as the manipulating device shown in U.S. patent application Ser. No. 853,001, and filed on Apr. 17, 1986, and incorporated herein by reference. The manipulating device would then be provided with a lower part 57 for coupling to the upper part 11.

It is understood that the foregoing description is that of the preferred embodiments of the invention and that various changes and modifications may be made thereto without departing from the spirit and scope of the invention as defined in the appended claims.

What is claimed is:

1. A coupling arrangement for exchanging components on a block of a hoist movable in the vertical direction, the coupling arrangement comprising:

an upper part defining a longitudinal axis extending in said vertical direction and being connected to the block so as to be rotatable about and movable along said axis;

said upper part including an annular body having a base wall disposed in a plane transverse to said axis, said annular body and said base wall conjointly defining a housing having an enclosed space;

a lower part including: a head mounted on said component and defining a longitudinal axis; two supporting pins extending from said head in a plane transverse to said longitudinal axis of said head;

said base wall having slot means formed therein which is dimensioned to permit said head and said pins to pass therethrough and into said enclosed space of said housing when said upper part is lowered over said head; and, latching means disposed in said housing at a predetermined angular spacing from said slot means for receiving and latching said supporting pins when said upper part is rotated about said longitudinal axis of said upper part after the latter has been lowered over said head in the direction of said longitudinal axis of said upper part.

2. The coupling arrangement of claim 1, said latching means comprising: wall means formed on said base so as to extend upwardly into said enclosed space to define two channels for receiving respective ones of said pins therein after said upper part has been moved downwardly in said vertical direction and rotated through said predetermined angular spacing so as to clear said wall means.

3. The coupling arrangement of claim 1, said predetermined angle being approximately 90° and said slot means being a slot disposed on a diameter of said base wall.

4. A coupling arrangement for exchanging components on a block of a hoist, the coupling arrangement comprising:

an upper part defining a longitudinal axis and being connected to the block so as to be rotatable about said axis;

said upper part including an annular body having a base wall disposed in a plane transverse to said axis, said annular body and said base wall conjointly defining a housing;

a lower part including: a head mounted on said component and defining a longitudinal axis; and, two supporting pins extending from said head in a plane transverse to said longitudinal axis of said head;

said base wall having slot means formed therein which is dimensioned to permit said head and said pins to pass therethrough and into said housing when said upper part is lowered over said head;

latching means disposed in said housing at a predetermined angular spacing from said slot means for receiving and latching said supporting pins when said upper part is rotated about said longitudinal axis of said upper part after the latter has been lowered over said head;

said latching means further including channel means formed on said base wall for receiving said pins therein after said upper part has been rotated through said predetermined angular spacing; and, said channel means including: two channels formed on said base wall and corresponding to respective ones of said supporting pins; and, said latching means further comprising two levers corresponding to respective ones of said channels and each one of said levers being pivotally mounted in said housing so as to be movable between a first position wherein said channel corresponding thereto is clear and a second position wherein said channel is blocked to hold the supporting pin therein, thereby preventing an unwanted dislodgement thereof out of said channel.

5. The coupling arrangement of claim 4 each of said levers having first and second ends and a latching bolt mounted on said first end thereof so as to cause the same to be above the channel corresponding to said lever when said lever is in said second position; said annular body having opening means formed therein and each of said levers being mounted in said housing so as to cause said second end thereof to extend outwardly through said opening means when said lever is in said first position thereby facilitating an actuation thereof from outside of said upper part.

6. The coupling arrangement of claim 5, said latching means further comprising two sets of blocks corresponding to respective ones of said supporting pins, each one of said sets including a first block and a second block both mounted on said base wall so as to be mutually parallel and spaced apart to define the channel for accommodating the supporting pin therein; and, said first block defining guide means for guiding said latching bolt into its position above the channel when the lever corresponding thereto is moved into said second position.

7. The coupling arrangement of claim 6, each of said second blocks being configured as a circular segment defining a glide path extending downwardly from an elevation above said slot to the channel corresponding thereto for guiding the supporting pin downwardly into its channel.

8. The coupling arrangement of claim 7, said head and said supporting pins conjointly being configured as a crosshead and said head having annular stop means formed thereon beneath said supporting pins for contact engaging said base wall when said upper part is lowered over said crosshead.

9. The coupling arrangement of claim 5, each of said levers being a bell-crank lever having first and second arms, said first arm extending in a vertical direction, and the outer end of said first arm being said first end; and, articulating means for articulately connecting said latching bolt to said outer end of said first arm; and, said second arm extending horizontally and outwardly through said opening means.

10. The coupling arrangement of claim 9, said articulating means comprising: bore means formed in said first arm; a lever insert slideably mounted in said bore means and having a lower end projecting outwardly from said outer end of said first arm; said latching bolt having a slotted opening formed therein for receiving said lower end of said lever insert therein; and, pin means for pivotally connecting said lower end of said lever insert to said latching bolt within said slotted opening.

11. The coupling arrangement of claim 9, said bell-crank lever defining a pivot axis and said latching means further comprising a tension spring connected at one end thereof to said second arm at a location thereon displaced from said pivot axis and said tension spring being connected at the other end thereof to said base wall for biasing said bell-crank lever into said second position thereof.

12. The coupling arrangement of claim 2, further comprising indicating means for indicating the presence of said supporting pins in said channel means.

13. A coupling arrangement for exchanging components on a block of a hoist, the coupling arrangement comprising:

an upper part defining a longitudinal axis and being connected to the block so as to be rotatable about said axis;

said upper part including an annular body having a base wall disposed in a plane transverse to said axis, said annular body and said base wall conjointly defining a housing;

a lower part including a head mounted on said component and defining a longitudinal axis; and, two supporting pins extending from said head in a plane transverse to said longitudinal axis of said head;

said base wall having slot means formed therein which is dimensioned to permit said head and said pins to pass therethrough and into said housing when said upper part is lowered over said head;

latching means disposed in said housing at a predetermined angular spacing from said slot means for receiving and latching said supporting pins when said upper part is rotated about said longitudinal axis of said upper part after the latter has been lowered has been lowered over said head;

said latching means including channel means formed on said base wall for receiving said pins therein after said upper part has been rotated through said predetermined angular spacing;

indicating means for indicating the presence of said supporting pins in said channel means; and, said indicating means including: a radially displaceable indicating pin mounted in said annular body; and, spring means resiliently biasing said indicating pin inwardly; said indicating pin being mounted in said annular body so as to be at approximately the same elevation as said supporting pin when the latter is seated in said channel means and so as to be displaced by said supporting pin against the force of said spring means to provided a visual indication at the outer surface of said annular body that said supporting pin is securely seated in said channel means.

14. The coupling arrangement of claim 1, further comprising a heavy metal jacket mounted on the outer surface of said annular body.

15. The coupling arrangement of claim 14, said heavy metal jacket being made of lead.

16. A coupling arrangement for exchanging components on a block of a hoist, the coupling arrangement comprising:

an upper part defining a longitudinal axis and being connected to the block so as to be rotatable about said axis;

said upper part including an annular body having a base wall disposed in a plane transverse to said axis, said annular body and said base wall conjointly defining a housing;

a lower part including: a head mounted on said component and defining a longitudinal axis; and, two supporting pins extending from said head in a plane transverse to said longitudinal axis of said head;

said base wall having slot means formed therein which is dimensioned to permit said head and said pins to pass therethrough and into said housing when said upper part is lowered over said head;

latching means disposed in said housing at a predetermined angular spacing from said slot means for receiving and latching said supporting pins when said upper part is rotated about said longitudinal axis of said upper part after the latter has been lowered over said head; and, a stand having seat means formed thereon for receiving and storing a lower part with the component corresponding thereto; and, unlatching means mounted on said stand for engaging said latching means as said upper part with said lower part is lowered onto said stand thereby unlatching said supporting pins to permit said upper part to rotate back through said angular spacing to bring said slot means into alignment with said pins so that said upper part can be withdrawn upwardly and away from said lower part which then remains seated and stored on said seat means with said component corresponding thereto.

17. The coupling arrangement of claim 5, further comprising a stand having seat means formed thereon for receiving and storing a lower part with the component corresponding thereto; and, actuation means mounted on said stand for engaging said outer ends of said levers when said upper part is lowered onto said stand to rotate said levers into said first position thereof to permit said upper part to be rotated back through said angular spacing to bring said slot means into alignment with said pins so that said upper part can be withdrawn upwardly and away from said lower part which then remains seated and stored on said seat means with said component corresponding thereto.

18. The coupling arrangement of claim 17, said actuation means being rotatably mounted on said stand so as to also engage said outer ends of said levers after said supporting pins are seated in said respective channels and said upper part is moved upwardly to ensure that said levers are firmly in said second positions thereof as said upper part is moved upwardly to lift said lower part and said component out of said stand.

19. A coupling arrangement for exchanging components on a block a hoist movable in the vertical direction, the coupling arrangement comprising:

an upper part defining a longitudinal axis extending in said vertical direction and being connected to the block so as to be rotatable about and movable along said axis;

said upper part including an annular body having a base wall disposed in a plane transverse to said axis, said annular body and said base wall conjointly defining a housing having an enclosed space;

a lower part including: a head mounted on said component and defining a longitudinal axis; and, two supporting pins extending from said head in a plane transverse to said longitudinal axis of said head;

said base wall having slot means formed therein which is dimensioned to permit said head and said pins to pass therethrough and into said enclosed space of said housing when said upper part is lowered over said head; and, holding means disposed in said housing at a predetermined angular spacing from said lost means for receiving and seating said supporting pins in response to a rotational movement about and a longitudinal movement along said axis of said upper part; and, securing means for securing said supporting pins in said holding means after said supporting means are seated therein.

* * * * *

UNITED STATES PATENT AND TRADEMARK OFFICE
CERTIFICATE OF CORRECTION

PATENT NO. : 4,858,978
DATED : August 22, 1989
INVENTOR(S) : Günter Schröder and Günther Dudek It is certified that error appears in the above-identified patent and that said Letters Patent is hereby corrected as shown below:

In column 1, line 44: insert a period between "tool", first occurrence, and "When".

In column 2, line 12: insert a comma between "and" and "two".

In column 2, line 43: insert a period between "mechanisms" and "Withdrawal".

In column 5, line 14: delete "view-" and substitute -- view -- therefor.

In column 6, line 37: delete "art 11." and substitute -- part 11. -- therefor.

In column 9, line 2: insert -- and, -- between "axis;" and "two".

In column 10, line 1: insert a comma between "claim 4" and "each".

In column 11, line 5: insert a colon after "including".

UNITED STATES PATENT AND TRADEMARK OFFICE
CERTIFICATE OF CORRECTION

PATENT NO. : 4,858,978
DATED : August 22, 1989
INVENTOR(S) : Günter Schröder and Günther Dudek It is certified that error appears in the above-identified patent and that said Letters Patent is hereby corrected as shown below:

In column 11, line 19:    delete "has been lowered".

In column 11, line 35:    delete "provided" and substitute -- provide -- therefor.

In column 12, line 38:    insert -- of -- between "block" and "a", second occurrence.

In column 12, line 58:    delete "lost" and substitute -- slot -- therefor.

Signed and Sealed this

Fifth Day of June, 1990

Attest:

HARRY F. MANBECK, JR.

*Attesting Officer*      *Commissioner of Patents and Trademarks*